United States Patent
Sambhwani et al.

(10) Patent No.: US 8,989,107 B2
(45) Date of Patent: Mar. 24, 2015

(54) ACTIVATION DEACTIVATION OF SECONDARY UL CARRIER IN DC HSUPA

(75) Inventors: Sharad Deepak Sambhwani, San Diego, CA (US); Andrei Dragos Radulescu, San Diego, CA (US); Rohit Kapoor, San Diego, CA (US); Bibhu Prasad Mohanty, San Diego, CA (US); Mario Mark Scipione, San Diego, CA (US); Danlu Zhang, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 12/769,853

(22) Filed: Apr. 29, 2010

(65) Prior Publication Data

US 2010/0278130 A1   Nov. 4, 2010

Related U.S. Application Data

(60) Provisional application No. 61/174,396, filed on Apr. 30, 2009.

(51) Int. Cl.
*H04W 4/00* (2009.01)
*H04W 72/04* (2009.01)
*H04W 92/12* (2009.01)

(52) U.S. Cl.
CPC ...... *H04W 72/0453* (2013.01); *H04W 72/0433* (2013.01); *H04W 92/12* (2013.01)
USPC ........................................................ 370/329

(58) Field of Classification Search
CPC .................. H04W 72/0413; H04W 72/042
USPC ........... 370/252, 241, 329; 455/436, 450, 522
See application file for complete search history.

(56) References Cited

U.S. PATENT DOCUMENTS

| | | | |
|---|---|---|---|
| 8,369,883 B2 * | 2/2013 | Kuroda et al. | 455/522 |
| 2009/0135769 A1 | 5/2009 | Sambhwani et al. | |
| 2009/0196195 A1 * | 8/2009 | Gerstenberger et al. | 370/252 |
| 2010/0130219 A1 * | 5/2010 | Cave et al. | 455/450 |
| 2010/0222059 A1 * | 9/2010 | Pani et al. | 455/436 |

FOREIGN PATENT DOCUMENTS

| | | |
|---|---|---|
| CN | 101340230 A | 1/2009 |
| WO | 2009040661 A2 | 4/2009 |

OTHER PUBLICATIONS

International Search Report and Written Opinion—PCT/US2010/033149—ISA/EPO—Jun. 17, 2010.
Qualcomm Europe: "Activation/De-Activation of Secondary UL Carrier in DC-HSUPA" 3GPP Draft; R3-091222, 3rd Generation Partnership Project (3GPP), Mobile Competence Centre ; 650, Route Des Lucioles ; F-06921 Sophia-Antipolis Cede X ;France, no. San Francisco, USA; Apr. 29, 2009, Apr. 1, 2009, XP0S0341583 [retrieved on May 29, 2009] the whole document.
Taiwan Search Report—TW099113981—TIPO—Mar. 18, 2013.

* cited by examiner

*Primary Examiner* — Mark Rinehart
*Assistant Examiner* — Gbemileke Onamuti
(74) *Attorney, Agent, or Firm* — Darren M. Simon (57) ABSTRACT

The present patent application discloses a method and apparatus for activating or de-activating a secondary carrier, comprising informing a serving radio network controller when a secondary carrier was activated or de-activated, receiving a confirmation from the serving radio network controller that non-serving NodeB cells have achieved synchronization, and scheduling a UE upon receiving confirmation. In another example, the present patent application discloses a method and apparatus for de-activating a secondary carrier, comprising controlling de-activation of the secondary carrier using high-speed shared control channel orders, receiving acknowledgement of said high-speed shared control channel orders, and informing a serving radio network controller when the secondary carrier was de-activated.

36 Claims, 10 Drawing Sheets

ACTIVATION DEACTIVATION OF SECONDARY UL CARRIER IN DC HSUPA

CROSS-REFERENCE TO RELATED APPLICATION

This application claims the benefit under 35 U.S.C. §119 of Provisional Application Ser. No. 61/174,396, Activation/De-activation of Secondary UL Carrier in DC-HSUPA, filed Apr. 30, 2009.

BACKGROUND

1. Field of the Invention

The present application pertains to the activation and de-activation of secondary UL carrier in dual-cell High-Speed Uplink Packet Access (DC-HSUPA).

2. Background

Universal Mobile Telecommunications System (UMTS) is one of the third-generation (3G) mobile telephone technologies (or 3rd Generation Wireless Mobile Communication Technology). A UMTS network consists of 1) a core network (CN), 2) a UMTS terrestrial radio access network (UTRAN) and 3) user equipment (UE). The core network work provides routing, switching, and transit for user traffic. A Global System for Mobile Communications (GSM) network with General Packet Radio Service (GPRS) is the basic core network architecture that UMTS is based on. The UTRAN provides the air interface access method for User Equipment. A base station is referred to as Node B and control equipment for Node Bs is called a radio network controller (RNC). For an air interface, UMTS most commonly uses a wideband spread-spectrum mobile air interface known as wideband code division multiple access (or W-CDMA). W-CDMA uses a direct sequence code division multiple access signaling method (or CDMA) to separate users.

A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit switched and IP based packet switched traffic types. The RNC provides control functionalities for one or more Node Bs. Connectivity is provided between the UE (user equipment) and the core network by the UTRAN.

Figure 1:
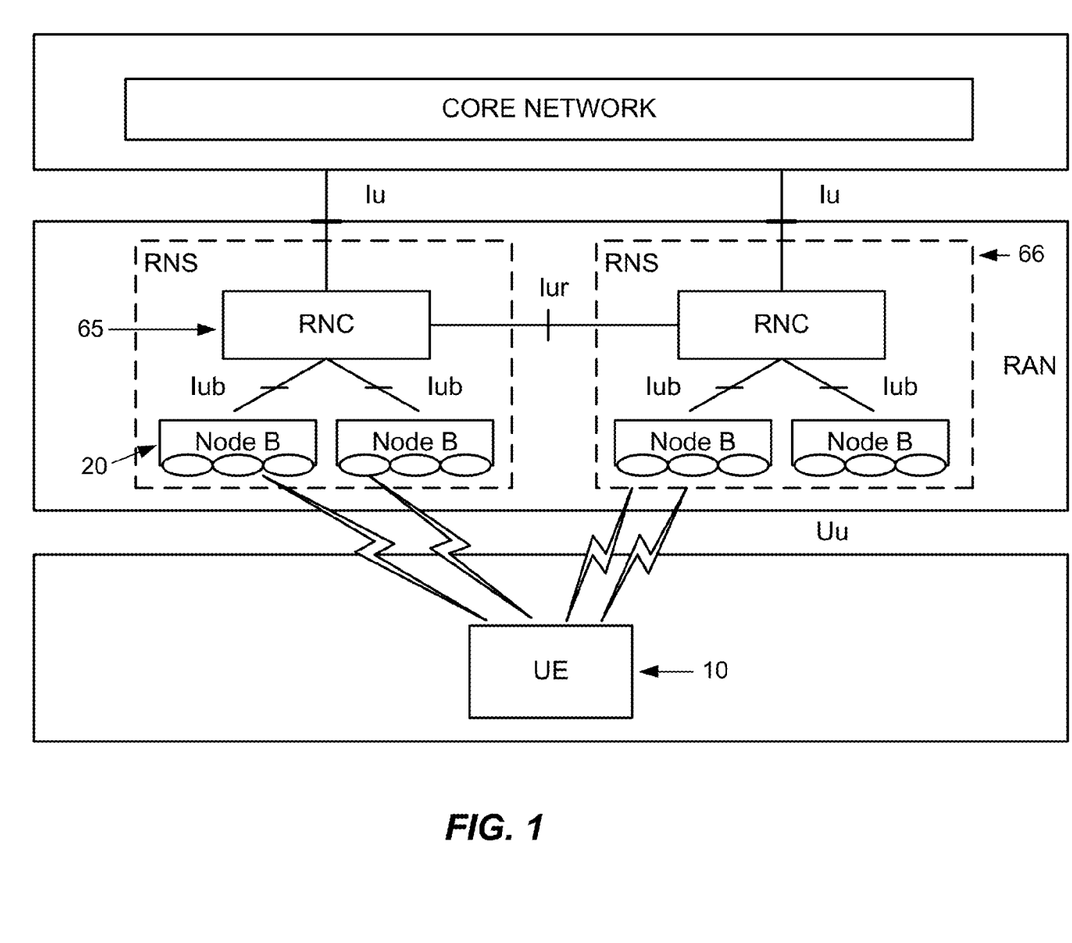
FIG. 1 is a block diagram is a block diagram illustrating a Universal Mobile Telecommunication System (UMTS)

The UTRAN is connected internally or externally to other functional entities by four interfaces: Iu, Uu, Iub and Iur. The UTRAN is attached to a GSM core network via an external interface called Iu. A radio network controller (RNC) supports this interface. In addition, RNC manages a set of base stations called Node Bs through interfaces labeled Iub. The Iur interface connects two RNCs with each other. The UTRAN is largely autonomous from the core network since the RNCs are interconnected by the Iur interface. FIG. 1 discloses a communication system which uses the RNC, the Node Bs and the Iu and Uu interfaces. The Uu is also external and connects the Node B with the UE, while the Iub is an internal interface connecting the RNC with the Node B.

The RNC fills multiple roles. First, it may control the admission of new mobiles or services attempting to use the Node B. Second, from the Node B, i.e. base station, point of view, the RNC is a controlling RNC. Controlling admission ensures that mobiles are allocated radio resources (bandwidth and signal/noise ratio) up to what the network has available. It is where Node B's Iub interface terminates. From the UE, i.e. mobile, point of view, the RNC acts as a serving RNC in which it terminates the mobile's link layer communications. From the core network point of view, the serving RNC terminates the Iu for the UE. The serving RNC also controls the admission of new mobiles or services attempting to use the core network over its Iu interface.

In the UMTS system, universal terrestrial radio access (UTRA) frequency division duplex (FDD) channels and UTRA time division duplex (TDD) channels may be used to communicate data. The communication link through which the user equipment sends signals to the Node B is called a uplink. Applying interference cancellation in Node Bs will allow them to receive transmissions at higher data rates, i.e., interference cancellation can increase data rates on the uplink. It can also increase capacity on the uplink.

The apparatuses and methods of the present patent application is directed to overcoming limitations of the prior art and providing improved memory design.

SUMMARY OF THE INVENTION

In view of the above, the described features of the present invention generally relate to one or more improved systems, methods and/or apparatuses for improved activating or de-activating a secondary carrier. In a first example, the present patent application comprises a method and apparatus for activating or de-activating a secondary carrier, comprising informing a serving radio network controller when a secondary carrier was activated or de-activated, receiving a confirmation from the serving radio network controller that non-serving NodeB cells have achieved synchronization, and scheduling a UE upon receiving confirmation.

In another example, the method and apparatus further comprises adapting a maximum transmit block size based on knowledge of a loading condition at neighboring cells. In another example, the secondary carrier is activated or de-activated when a DC-HSUPA configured UE is in soft handover with multiple NodeBs.

In another example, the method and apparatus further comprises periodically receiving a maximum transmit block size for all users, whereby an impact of interference at said non-serving NodeB cells is limited when the secondary carrier is re-activated.

In another example, the method and apparatus further comprises receiving a pre-configured maximum serving grant upon secondary carrier re-activation.

In another example, the method and apparatus further comprises informing the non-serving NodeB cells that the secondary carrier was activated or de-activated, and informing the serving radio network controller when synchronization has been achieved. In another example, the informing the serving radio network controller when synchronization has been achieved occurs after the secondary carrier was activated.

In another example, the present patent application comprises a method and apparatus for de-activating a secondary carrier, comprising controlling de-activation of the secondary carrier using high-speed shared control channel orders, receiving acknowledgement of said high-speed shared control channel orders, and informing a serving radio network controller when the secondary carrier was de-activated.

In another example, the method and apparatus further comprises informing the serving radio network controller of a radio link failure; and halting physical layer synchronization procedures on the second carrier.

In another example, the present patent application comprises a method and apparatus for activating a secondary carrier, comprising controlling activation of the secondary carrier using high-speed shared control channel orders, receiving acknowledgement of said high-speed shared control channel orders; and informing a serving radio network controller when the secondary carrier was activated.

In another example, the method and apparatus further comprises resuming physical layer synchronization procedures on the secondary carrier, informing the serving radio network controller of a restored radio link, and sending a confirmation that all radio links are restored in a UE's active set on the secondary carrier.

Further scope of the applicability of the present method and apparatus will become apparent from the following detailed description, claims, and drawings. However, it should be understood that the detailed description and specific examples, while indicating preferred examples of the invention, are given by way of illustration only, since various changes and modifications within the spirit and scope of the invention will become apparent to those skilled in the art.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout.

DETAILED DESCRIPTION

The detailed description set forth below in connection with the appended drawings is intended as a description of exemplary examples of the present invention and is not intended to represent the only examples in which the present invention can be practiced. The term "exemplary" used throughout this description means "serving as an example, instance, or illustration," and should not necessarily be construed as preferred or advantageous over other examples. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

The 3rd Generation Partnership Project (3GPP) is a collaboration agreement that was established in December 1998. It is a co-operation between ARIB/TTC (Japan), ETSI (Europe), ATIS (North America), CCSA (China) and TTA (South Korea). The scope of 3GPP is to make a third generation (3G) mobile phone system specification within the scope of the ITU's IMT-2000 project globally applicable. 3GPP specifications are based on evolved GSM specifications, which are generally known as the UMTS system. 3GPP standards are structured as Releases. Discussion of 3GPP thus frequently refers to the functionality in one release or another. For example, release 99 specifies the first UMTS 3G networks, incorporating a CDMA air interface. Release 6 integrates operation with Wireless LAN networks and adds High Speed Uplink Packet Access (HUSPA). In release 8, UMTS is refactored as an IP based fourth-generation network.

Carrier Activation

The following are features with regard to carrier activation in DC-HSUPA. 1) A radio network controller (RNC) reconfiguration is most always possible, e.g. Inter Frequency Handover (IFHO) may be used for serving cell change between two carriers. (The radio network controller is the control equipment for Node-B's as discussed above).

2) Whenever the secondary serving High-Speed Downlink Shared Channel (HS-DSCH cell is disabled/deactivated, the secondary serving enhanced dedicated channel (E-DCH) cell is disabled/deactivated as well. The High-Speed Downlink Shared Channel (HS-DSCH) is a channel added to UMTS to increase downlink data rates that is defined in Release 5 of the UMTS specifications. HS-DSCH may be mapped onto one or several physical channels (also known as codes) which may use a spreading factor 16. HS-DSCH serves as a transport channel shared among all users that are using HSPDA for their interactive/background radio access bearer. Enhanced dedicated channels (E-DCHs) are high data rate uplink channels introduced in release 6 of UMTS. An E-DCH includes an enhanced control part (e.g., an E-DCH dedicated physical control channel (E-DPCCH) and an enhanced data part (e.g., an E-DCH dedicated physical data channel (E-DPDCH) in accordance with UMTS protocols).

3) A serving NodeB may control (de)activation of the secondary carrier using High-Speed Shared Control Channel (HS-SCCH) orders (e.g. another bit in the existing HS-SCCH order type introduced for Rel-8 DC-HSDPA) is supported for the case when active set size is 1. The High-Speed Shared Control Channel (HS-SCCH) is defined in Release 5 of the UMTS specifications and is part of HSDPA. It is a channel added to UMTS to increase downlink data rates.

Serving NodeB Controlled (De)Activation of Secondary Serving E-DCH Cell when UE is in Soft Handover The serving NodeB may control (de) activation of the UE when the active set size is 1. This also applies to the case when active set size >1 as long as the UE's active set consisted of cells belonging to a single NodeB (to allow for a softer handover case). The following addresses issues that may arise when allowing the Serving NodeB to control (de)activation when the UE's active set consists of cells belonging to multiple NodeBs.

3.1 Accidental Radio Link Deletion at the Non-Serving NodeB Cell

When the UE de-activates the secondary carrier, via a successful reception of an HS-SCCH order from the Serving NodeB cell, after some time the Non-Serving NodeB cells will transition to the out-of-sync state. The Radio Link Failure procedure may then be triggered at these NodeBs after a period of time T_RLFAILURE has elapsed with a persisting out-of-sync indication. Without knowing that the secondary carrier got de-activated, there is ambiguity at the serving radio network controller (S-RNC) on whether the radio link at the Non-Serving NodeB cell failed due to poor radio conditions or whether the secondary carrier was de-activated. Hence, the S-RNC may accidentally delete the radio link.

3.2 Futile Search at the Non-Serving NodeB Cell

If the S-RNC decides not to delete the radio link at the Non-Serving NodeB cell, then as long as the secondary uplink carrier remains de-activated, the Non-Serving NodeB cell may unnecessarily wastes physical layer resources trying to search the UE.

Figure 2:
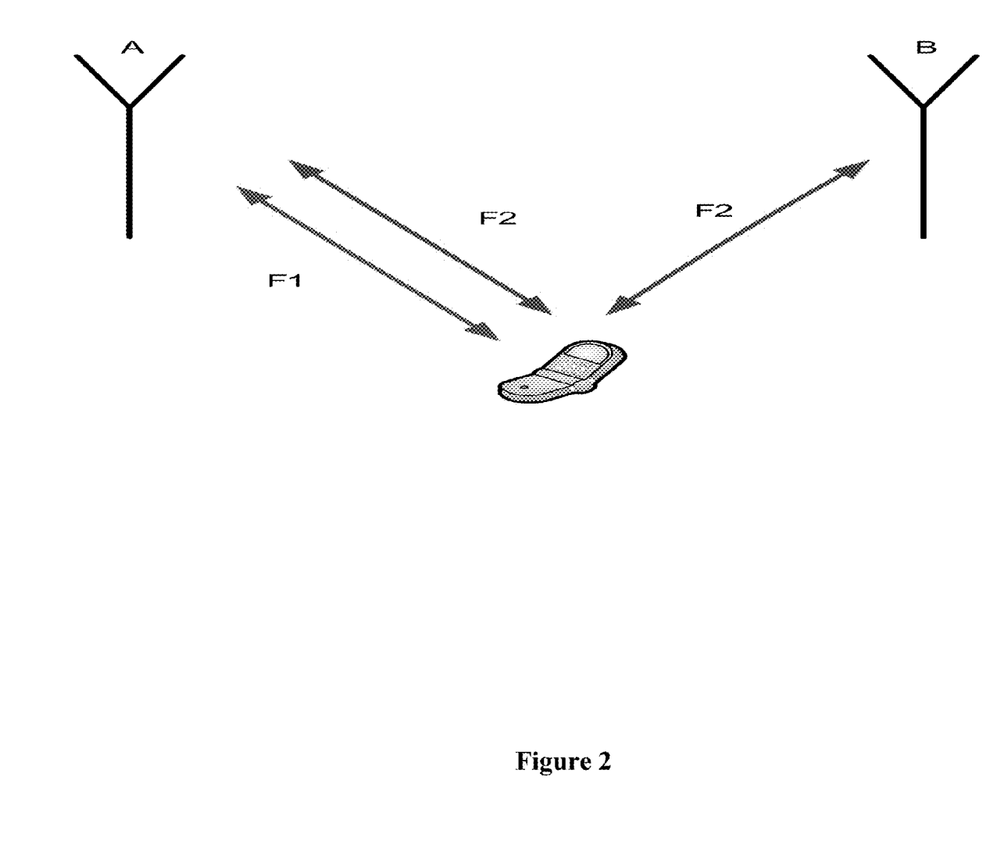
FIG. 2 illustrates independent active sets per carrier: F1(A), F2(B)

3.3 Independent Active Sets on Each Carrier: Increase in Search Requirement at the Non-Serving NodeB Cell If the UE's active set on each of the carriers are independent, then it is possible that the non-serving NodeB cell transmits and receives only on the secondary carrier (FIG. 2). FIG. 2 illustrates independent active sets per carrier: F1(A), F2(B). In this case, when the secondary carrier gets de-activated by the Serving NodeB cell, due to a lack of a phase reference, the non-serving NodeB may search for the UE across a wider search window. This, in turn, results in an increase in searcher processing at the non-serving NodeB as well as a delay in achieving physical layer synchronization when the secondary carrier is re-activated.

3.4 Interference Impact at Non-Serving NodeB Cell

In the absence of macro-diversity in WCDMA, due to lack of power control, there is may be an interference impact at the Non-Serving NodeB cells. Based on a system level simulation result of system performance performed on an enhanced uplink in Release 6 to compare primary cell only scheduling against multiple cell scheduling for soft handover (SHO) UEs, it was observed that multiple cell scheduling achieves 15% better cell throughput than serving cell only scheduling at the same RoT level.

In Release-8 during the enhanced uplink (EUL) in the CELL_FACH state, the interference impact of enhanced uplink in CELL_FACH users may be significant. It is noted that these users may not use macro-diversity in the CELL_FACH state and in the absence of power control and rate control may cause significant interference impact at a neighbor cell when they are in a soft handover region. The UTRAN may direct an UE to transition between a number of radio resource control (RRC) states. One such state is a Cell_FACH state. The Cell_FACH state does not use dedicated channels and is characterized by a forward access channel (FACH). It is noted that in the CELL_FACH state, the UE may control its own mobility independently and starts a cell switch as soon as a neighboring cell has a better quality than the current cell. The CELL_FACH state may be characterised by: a) No dedicated physical channel is allocated to the UE; b) The UE continuously monitors a forward access channel (FACH) in the downlink; c) The UE is assigned a default common or shared transport channel in the uplink (e.g. RACH) that it can use anytime according to the access procedure for that transport channel. d) The position of the UE is known by UTRAN on cell level according to the cell where the UE last made a cell update; e) In TDD mode, one or several USCH or DSCH transport channels may have been established.

If the UE's secondary carrier is dynamically activated by the serving NodeB cell prior to the expiration of T_RLFAILURE, the non-serving NodeB cell is subject to inter-cell interference for a period of time. The interference is present for the time it takes the non-serving NodeB cell to cover a large search window, transition to the in-sync state and trigger the radio link (RL) Restore procedure. This added interference impacts system capacity and coverage.

3.5 UE Enters Soft Handover Region while Secondary Carrier is De-Activated

Even if a UE was not in soft handover when the secondary carrier got de-activated, during the period the carrier was de-activated, the UE may enter a soft handover region. By the time the UTRAN were to add a new active set member, the serving NodeB may re-activate the secondary carrier and then in that case, until the non-serving NodeB cell is added to the UE's active set, the UE may cause interference to this candidate Non-Serving NodeB cell.

Solution

Figure 3:
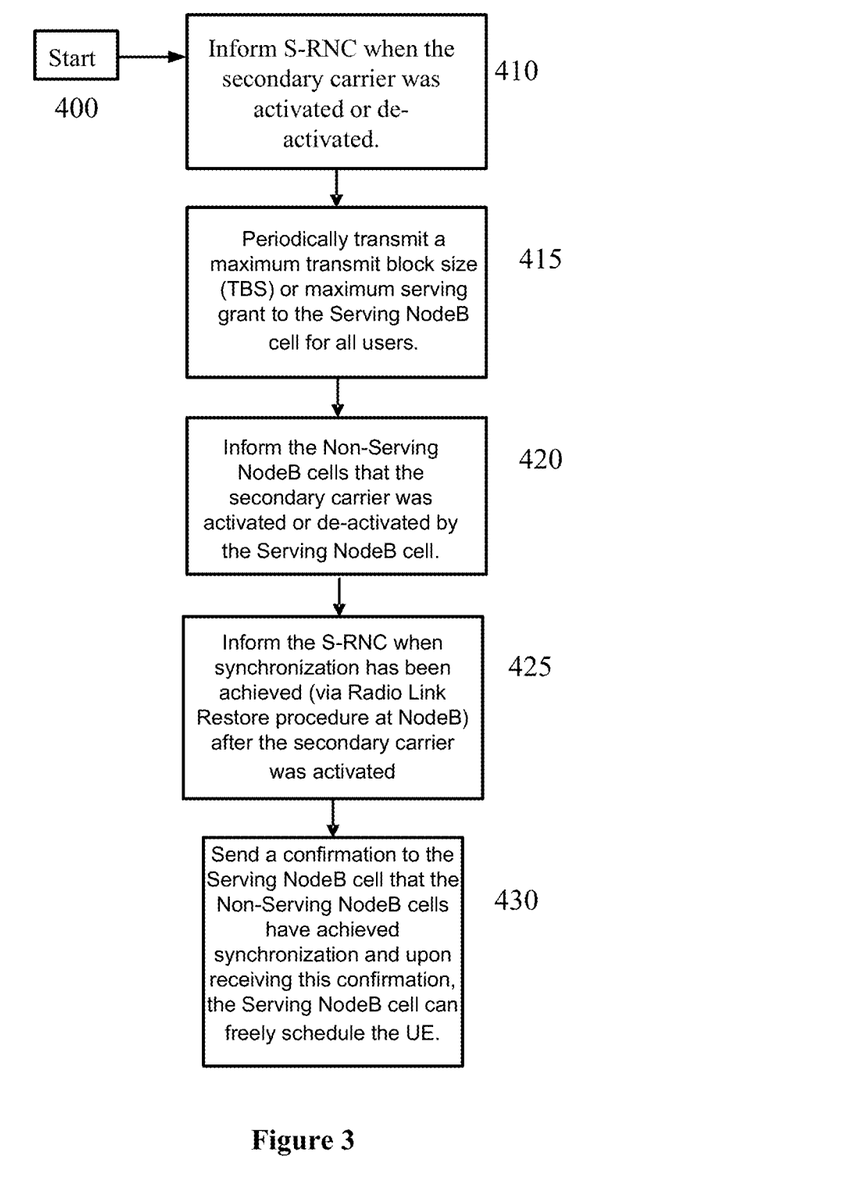
FIG. 3 is a flowchart illustrating the steps taken when the secondary carrier is activated or de-activated by a Serving NodeB cell.

The following discloses a method and apparatus for solving the problem of Serving NodeB controlled activation or deactivation of a secondary serving E-DCH cell, when the UE is in soft handover. In particular, there is a use for the following steps in which pieces of information are exchanged on the Iub interface between all the NodeBs in the active set and the S-RNC as follows:

Serving NodeB cell informs the S-RNC when the secondary carrier was activated or de-activated by the Serving NodeB cell (step 410 of FIG. 3).

As a means of limiting the impact of interference at the Non-Serving NodeB cells when the secondary carrier is re-activated, the S-RNC may periodically transmit a maximum transmit block size (TBS) or maximum serving grant to the Serving NodeB cell for all users (we include non-SHO users based on the reasoning in Section 3.5) (step 415).

This maximum TBS may be adapted from time to time based on knowledge of the loading condition at the neighbor cells. Note that the serving NodeB cell need not apply this feature if the UE is only connected to this NodeB (i.e. no other NodeB is in the UE's active set).

The S-RNC informs the Non-Serving NodeB cells that the secondary carrier was activated or de-activated by the Serving NodeB cell. This information can allow the Non-Serving NodeB cells to start and stop the physical layer synchronization procedures (searcher functionality at the NodeB) (step 420).

The Non-Serving NodeB cells inform the S-RNC when synchronization has been achieved (via Radio Link Restore procedure at NodeB) after the secondary carrier was activated (step 425).

S-RNC sends a confirmation to the Serving NodeB cell that the Non-Serving NodeB cells have achieved synchronization and upon receiving this confirmation, the Serving NodeB cell can freely schedule the UE, i.e., remove the upper limit on transport block size that was applied when the secondary carrier was activated (step 430).

Such a solution can ensure that the UE begins to immediately transmit on the secondary carrier. In one example, this may be at a restricted rate until the Non-Serving NodeB cells achieve physical layer synchronization of the secondary carrier.

Figure 4:
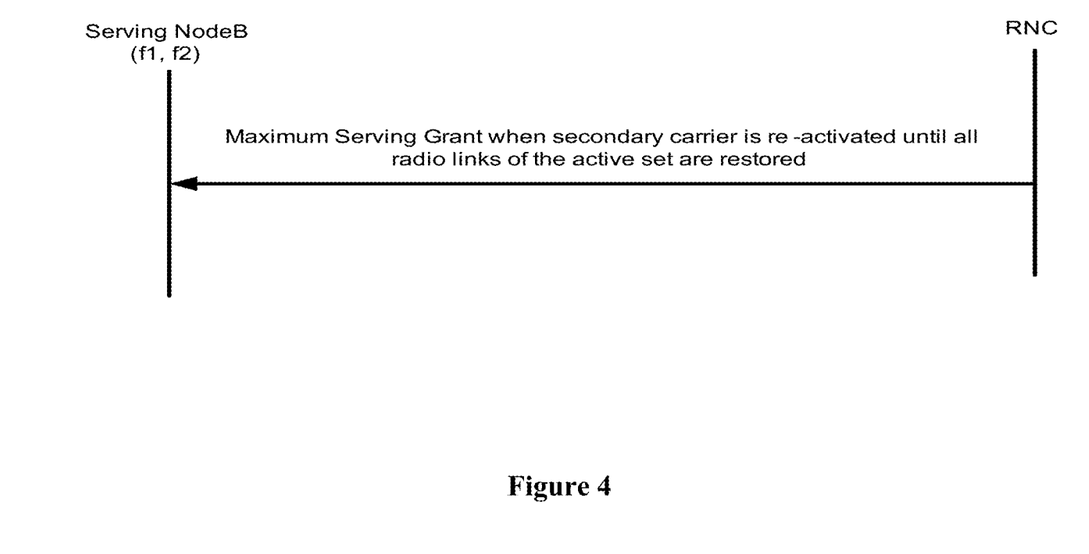
FIG. 4 illustrates the pre-configuration of a maximum serving grant upon secondary carrier re-activation.
Figure 5:
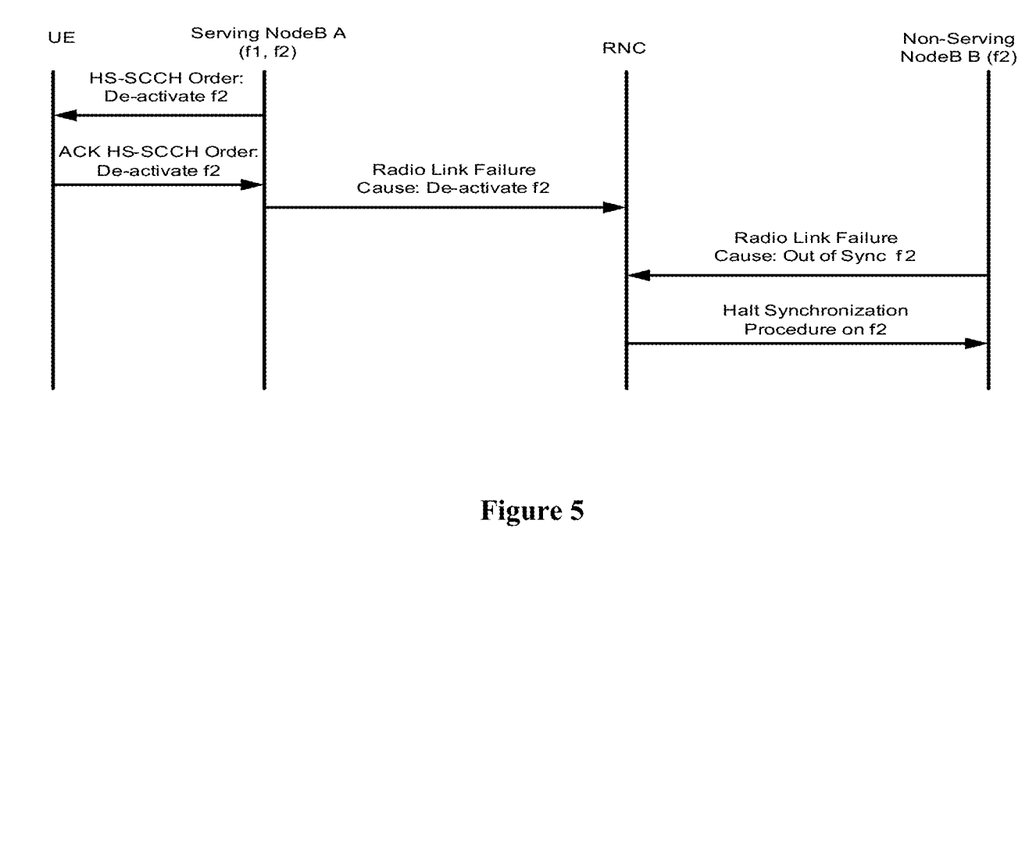
FIG. 5 illustrates secondary carrier de-activation where information is exchanged between the UE, the NodeBs, and the RNC.
Figure 6:
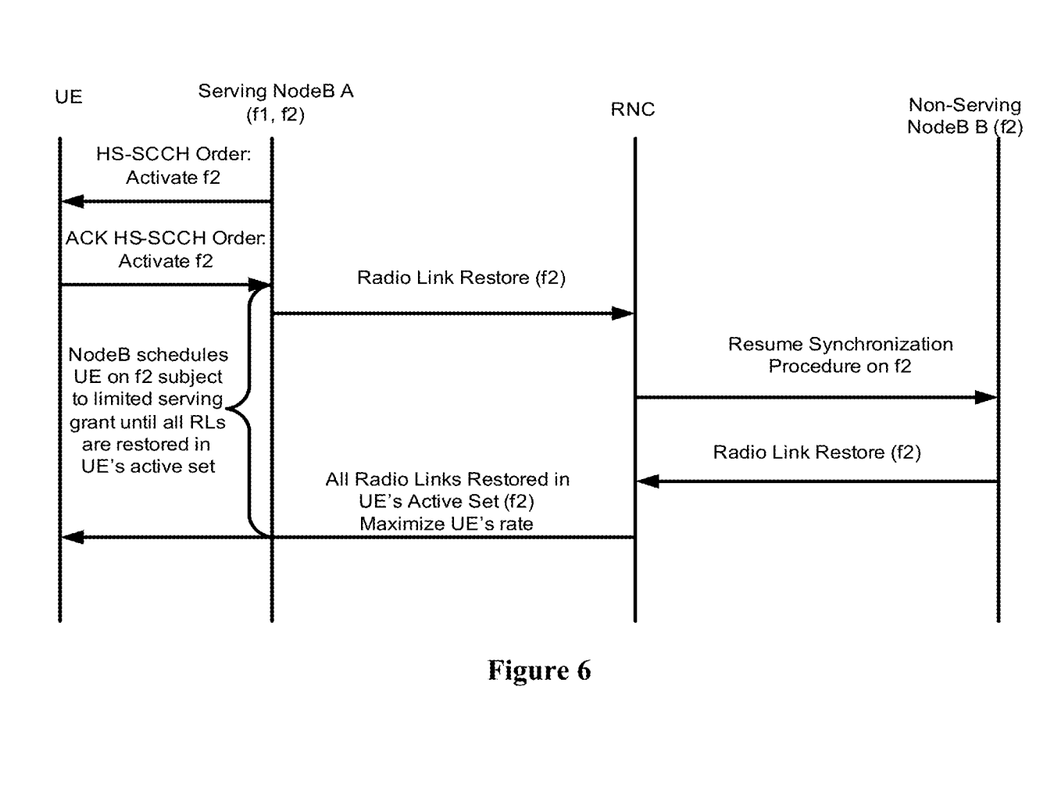
FIG. 6 illustrates secondary carrier activation where information is exchanged between the UE, the NodeBs, and the RNC.

In FIGS. 4 through 6, assuming the soft handover scenario as in FIG. 1, the patent application discloses high-level call flow diagrams illustrating the proposed solution. FIG. 4 illustrates the pre-configuration of a maximum serving grant upon secondary carrier re-activation. FIG. 5 illustrates secondary carrier de-activation where information is exchanged between the UE, the NodeBs, and the RNC. FIG. 6 illustrates secondary carrier activation where information is exchanged between the UE, the NodeBs, and the RNC.

Figure 7:
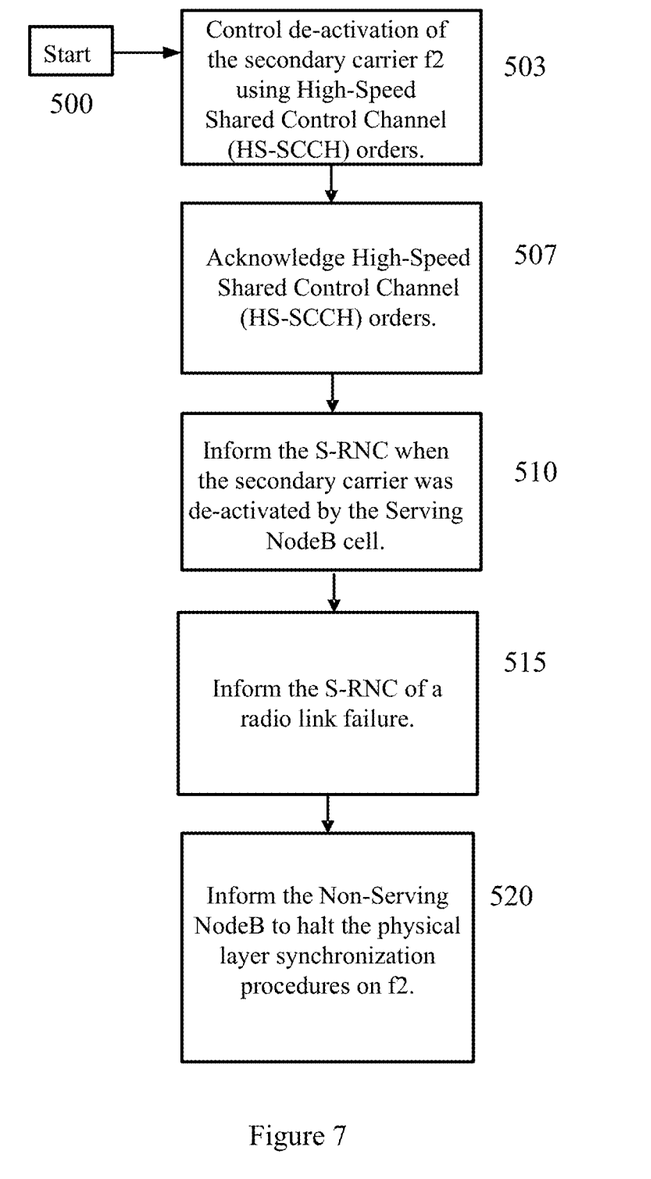
FIG. 7 is a flowchart illustrating the steps taken during secondary carrier de-activation where information is exchanged between UE, NodeBs, and the RNC.

FIG. 7 is a flowchart illustrating the steps taken during secondary carrier de-activation where information is exchanged between UE, NodeBs, and the RNC. A serving NodeB controls de-activation of the secondary carrier f2 using High-Speed Shared Control Channel (HS-SCCH) orders (step 503 of FIG. 7). The High-Speed Shared Control Channel (HS-SCCH) orders are acknowledged (ACK) (step 507). Serving NodeB cell informs the S-RNC when the secondary carrier was de-activated by the Serving NodeB cell (step 510 of FIG. 7). The Non-Serving NodeB cells inform the S-RNC of a radio link failure (step 515). The S-RNC informs the Non-Serving NodeB to halt the physical layer synchronization procedures on f2 (Step 520).

Figure 8:
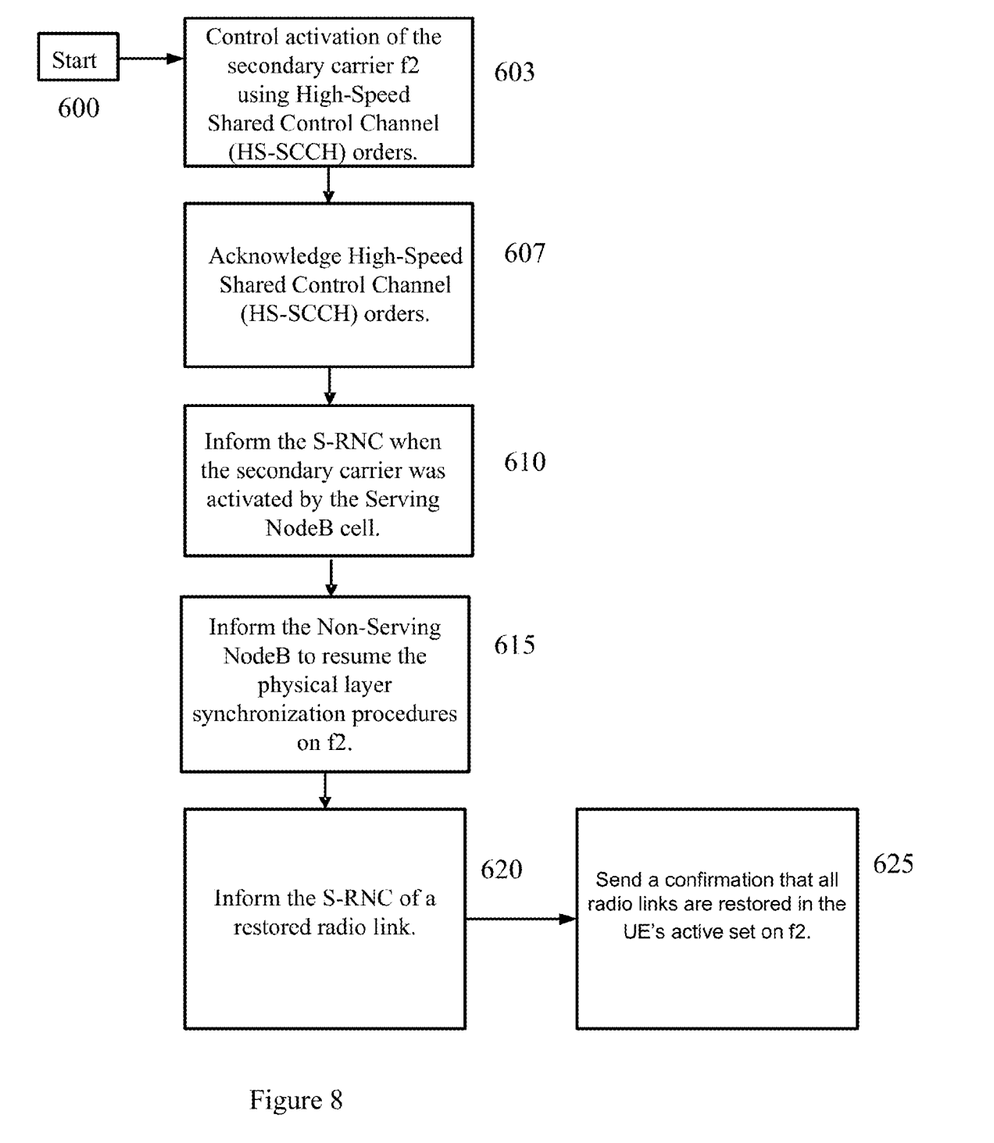
FIG. 8 is a flowchart illustrating the steps taken during secondary carrier activation where information is exchanged between UE, NodeBs, and the RNC.

FIG. 8 is a flowchart illustrating the steps taken during secondary carrier activation where information is exchanged between UE, NodeBs, and the RNC. A serving NodeB controls activation of the secondary carrier f2 using High-Speed Shared Control Channel (HS-SCCH) orders (step 603 of FIG. 8). The High-Speed Shared Control Channel (HS-SCCH) orders are acknowledged (ACK) (step 607). Serving NodeB cell informs the S-RNC when the secondary carrier was activated by the Serving NodeB cell (step 610 of FIG. 8). The S-RNC informs the Non-Serving NodeB to resume the physical layer synchronization procedures on f2 (Step 615). The Non-Serving NodeB cells inform the S-RNC of a restored radio link (step 620). The S-RNC sends a confirmation that all radio links are restored in the UE's active set on f2 (step 625).

The present patent application addresses the problem of Serving NodeB controlled secondary carrier activation/de-activation when the DC-HSUPA configured UE is in soft handover with multiple NodeBs. The robust solution is based on inter-cell interference mitigation methods. The present method and apparatus allows for relevant exchange of information between the S-RNC and the NodeB cells indicating when the secondary carrier was activated/de-activated as well as limiting the serving grant or TBS to schedule UEs in soft handover with multiple NodeBs for the period between the activation of the secondary carrier and the time when all the Non-Serving NodeB cells have synchronized with the UE on the secondary carrier. A specification of the HS-SCCH orders is for activation/deactivation is also presented.

Communication systems may use a single carrier frequency or multiple carrier frequencies. Each link may incorporate a different number of carrier frequencies. Furthermore, an access terminal 10 may be any data device that communicates through a wireless channel or through a wired channel, for example using fiber optic or coaxial cables. An access terminal 10 may be any of a number of types of devices including but not limited to PC card, compact flash, external or internal modem, or wireless or wireline phone. The access terminal 10 is also known as user equipment (UE), a remote station, a mobile station or a subscriber station. Also, the UE 10 may be mobile or stationary.

User equipment 10 that has established an active traffic channel connection with one or more Node Bs 20 is called active user equipment 10, and is said to be in a traffic state. User equipment 10 that is in the process of establishing an active traffic channel connection with one or more Node Bs 20 is said to be in a connection setup state. User equipment 10 may be any data device that communicates through a wireless channel or through a wired channel, for example using fiber optic or coaxial cables. The communication link through which the user equipment 10 sends signals to the Node B 20 is called a uplink. The communication link through which an NodeB 20 sends signals to a user equipment 10 is called a downlink.

Figure 9:
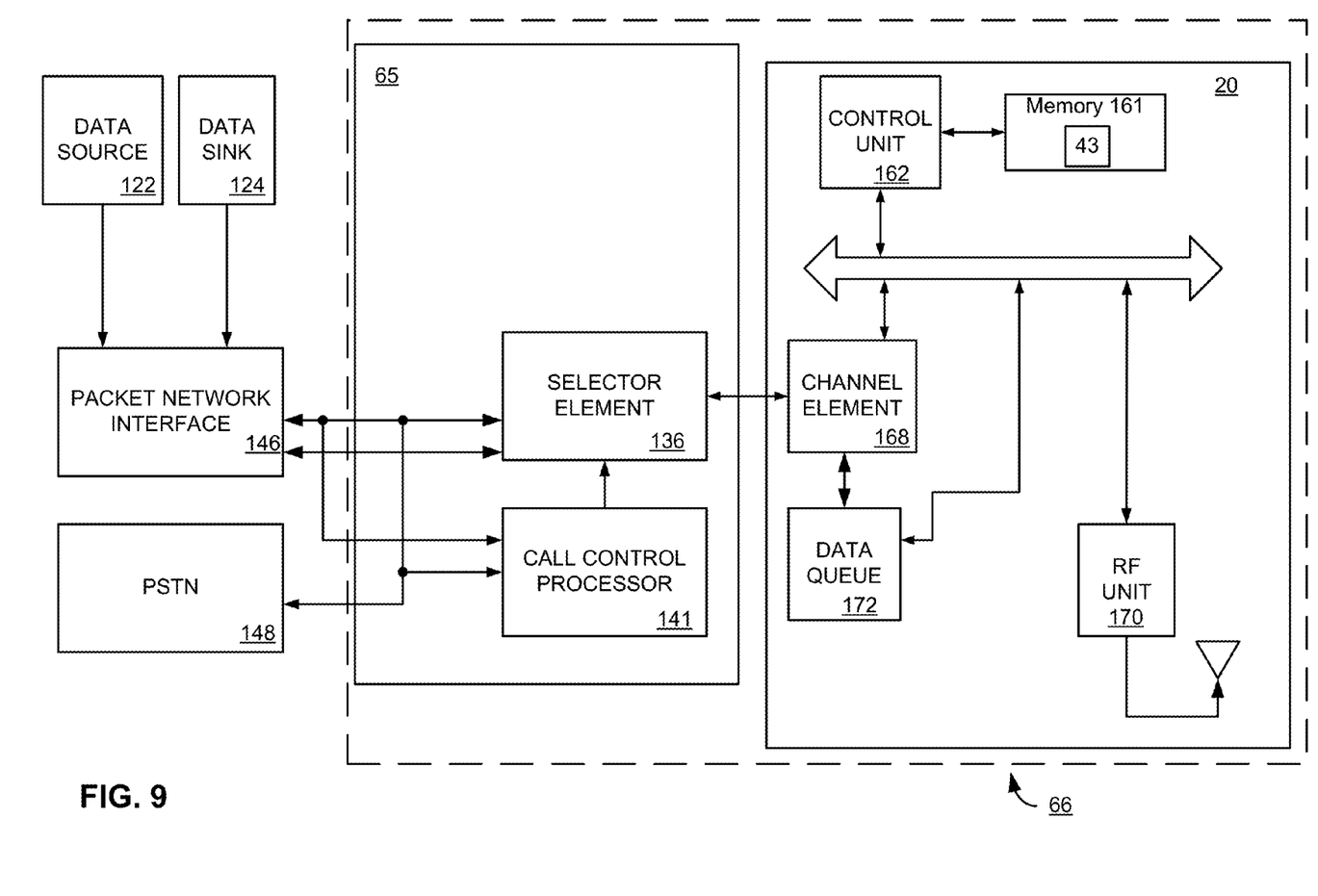
FIG. 9 illustrates a Node B and a radio network controller (RNC) in communication with a packet network interface.

FIG. 9 is detailed herein below, wherein specifically, a Node B 20 and radio network controller 65 interface with a packet network interface 146. The Node B 20 and radio network controller 65 may be part of a radio network server (RNS) 66. The associated quantity of data to be transmitted is retrieved from a data queue 172 in the Node B 20 and provided to the channel element 168 for transmission to the remote station 10 associated with the data queue 172.

Radio network controller 65 interfaces with packet network interface 146, Public Switched Telephone Network (PSTN) 148, and all Node Bs 20 in the communication system 100 (only one Node B 20 is shown in FIG. 9 for simplicity). Radio network controller 65 coordinates the communication between remote stations 10 in the communication system and other users connected to packet network interface 146 and PSTN 148. PSTN 148 interfaces with users through a standard telephone network (not shown in FIG. 9).

Radio network controller 65 contains many selector elements 136, although only one is shown in FIG. 9 for simplicity. Each selector element 136 is assigned to control communication between one or more Node B's 20 and one remote station 10 (not shown). If selector element 136 has not been assigned to a given user equipment 10, call control processor 141 is informed of the need to page the remote station. Call control processor 141 then directs Node B 20 to page the remote station 10.

Data source 122 contains a quantity of data, which is to be transmitted to a given remote station 10. Data source 122 provides the data to packet network interface 146. Packet network interface 146 receives the data and routes the data to the selector element 136. Selector element 136 then transmits the data to Node B 20 in communication with the target remote station 10. In one example, each Node B 20 maintains a data queue 172, which stores the data to be transmitted to the remote station 10.

For each data packet, channel element 168 inserts the control fields. In one example, channel element 168 performs a cyclic redundancy check, CRC, encoding of the data packet and control fields and inserts a set of code tail bits. The data packet, control fields, CRC parity bits, and code tail bits comprise a formatted packet. Channel element 168 then encodes the formatted packet and interleaves (or reorders) the symbols within the encoded packet. The interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 10, the downlink signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at Node B 20, specifically the de-interleaving, decoding, and CRC check functions. The decoded data is provided to a data sink.

Figure 10:
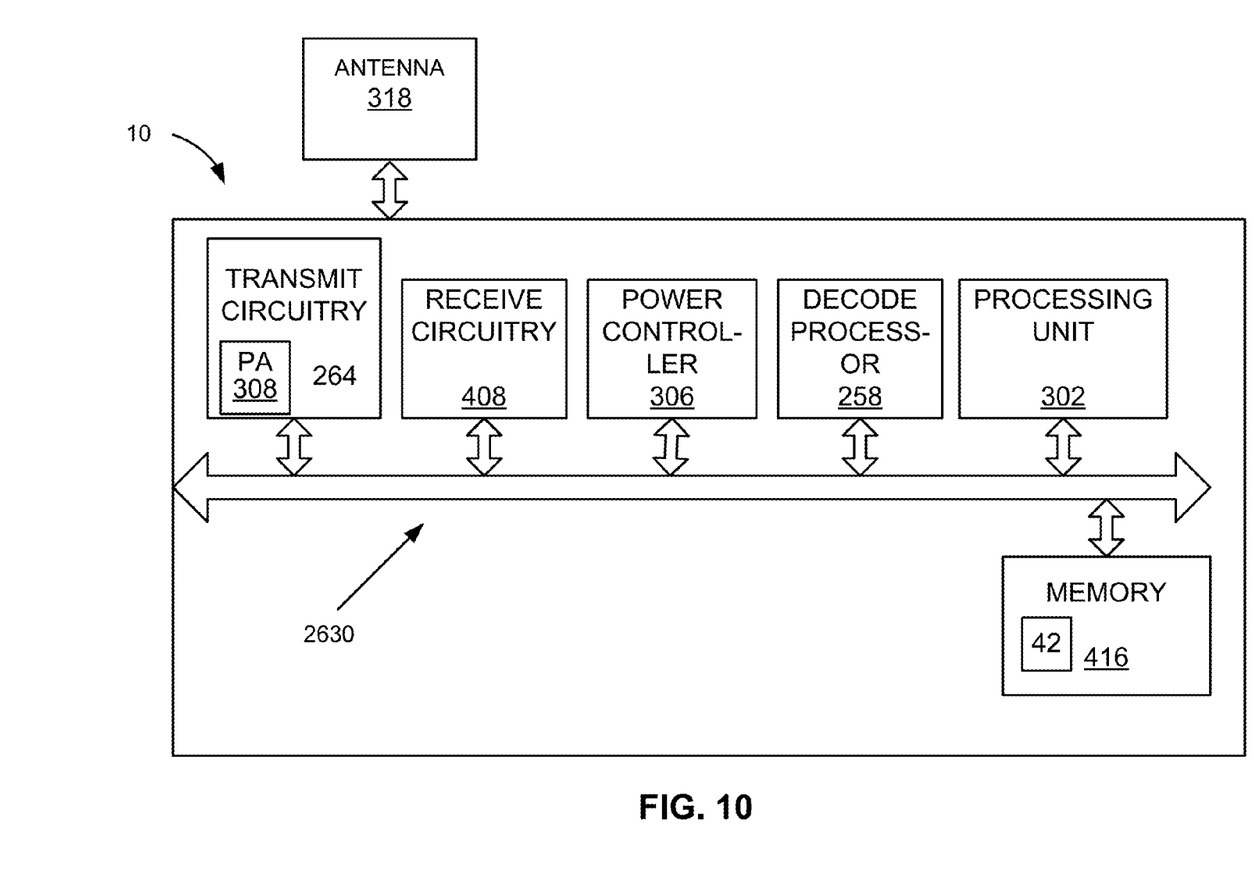
FIG. 10 illustrates an example of a UE 10 according to the present patent application.

FIG. 10 illustrates an example of a UE 10 according to the present patent application in which the UE 10 includes transmit circuitry 264 (including PA 308), receive circuitry 408, throttle control 306, decode process unit 258, processing unit 302, and memory 416.

The processing unit 302 controls operation of the UE 10. The processing unit 302 may also be referred to as a CPU. Memory 416, which may include both read-only memory (ROM) and random access memory (RAM), provides instructions and data to the processing unit 302. A portion of the memory 416 may also include non-volatile random access memory (NVRAM).

The UE 10, which may be embodied in a wireless communication device such as a cellular telephone, may also include a housing that contains a transmit circuitry 264 and a receive circuitry 408 to allow transmission and reception of data, such as audio communications, between the UE 10 and a remote location. The transmit circuitry 264 and receive circuitry 408 may be coupled to an antenna 318.

The various components of the UE 10 are coupled together by a bus system 2630 which may include a power bus, a control signal bus, and a status signal bus in addition to a data bus. However, for the sake of clarity, the various busses are illustrated in FIG. 10 as the bus system 2630. The UE 10 may also include a processing unit 302 for use in processing signals. Also shown are a power controller 306, a decode processor 258, and a power amplifier 308.

The steps illustrated in FIGS. 3-8 may be stored as instructions in the form of software or firmware 42 located in memory 416 in the UE 10. It may also be stored in the form of software or firmware 43 located in memory 161 in the NodeB 20.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

Therefore, the present invention is not to be limited except in accordance with the following claims.

The invention claimed is:

1. A method of activating a secondary carrier at a serving NodeB, comprising:
informing a serving radio network controller (RNC) when a secondary carrier for a user equipment (UE) was activated at one or more non-serving NodeB cells;
scheduling the UE at least in part by limiting a transmit block size (TBS) or a serving grant based at least in part on informing the serving RNC that the second carrier is activated;
receiving, at the serving NodeB, a confirmation from the serving RNC that the one or more non-serving NodeB cells have achieved synchronization with the UE over the secondary carrier; and
scheduling, at the serving NodeB, the UE without limiting the TBS or the serving grant based at least in part on receiving the confirmation from the serving RNC.

2. The method according to claim 1, further comprising adapting the maximum transmit block size based on knowledge of a loading condition at neighboring cells.

3. The method according to claim 1, wherein the secondary carrier is activated when the UE is a dual-cell High-Speed Uplink Packet Access (DC-HSUPA) configured UE in soft handover with multiple NodeBs.

4. The method according to claim 1, further comprising periodically receiving the maximum transmit block size for all users, whereby an impact of interference at the one or more non-serving NodeB cells is limited when the secondary carrier is re-activated.

5. The method according to claim 1, further comprising receiving a pre-configured maximum serving grant upon secondary carrier re-activation.

6. The method according to claim 1, further comprising:
informing the one or more non-serving NodeB cells that the secondary carrier was activated; and
informing the serving RNC when synchronization has been achieved.

7. The method according to claim 6, wherein the informing the serving RNC when synchronization has been achieved occurs after the secondary carrier was activated.

8. A method of de-activating a secondary carrier at a serving NodeB, comprising:
controlling, from the serving NodeB, de-activation of the secondary carrier at a user equipment (UE) using high-speed shared control channel (HS-SCCH) orders;
receiving, at the serving NodeB, acknowledgement of the HS-SCCH orders from the UE;
informing, by the serving NodeB, a serving radio network controller (RNC) when the secondary carrier was de-activated based on the HS-SCCH orders;
informing, by one or more non-serving NodeBs, the serving RNC of a radio link failure on the secondary carrier;
receiving, by the one or more non-serving NodeBs, instructions from the serving RNC to halt physical layer synchronization procedures on the second carrier based at least in part on the informing, by the serving NodeB, the serving RNC when the second carrier was de-activated and on the informing, by the one or more non-serving NodeBs, the serving RNC of the radio link failure on the secondary carrier; and
halting physical layer synchronization procedures on the second carrier based at least in part on receiving instructions from the serving RNC.

9. A method of activating a secondary carrier at a serving NodeB, comprising:
controlling, from the serving NodeB, activation of the secondary carrier at a user equipment (UE) using high-speed shared control channel (HS-SCCH) orders;
receiving, at the serving NodeB, acknowledgement of the HS-SCCH orders from the UE;
informing, by the serving NodeB, a serving radio network controller (RNC) when the secondary carrier was activated based on the HS-SCCH orders;
resuming, at one or more non-serving NodeBs, physical layer synchronization procedures on the secondary carrier based at least in part on an indication from the serving RNC that the second carrier is activated;
informing, at the one or more non-serving NodeBs, the serving RNC of a restored radio link; and
sending, from the serving RNC, a confirmation that all radio links are restored in the UE active set on the secondary carrier.

10. An apparatus for activating a secondary carrier at a serving NodeB, comprising:
means for informing a serving radio network controller (RNC) when a secondary carrier for a user equipment (UE) was activated at one or more non-serving NodeB cells;
means for scheduling the UE at least in part by limiting a transmit block size (TBS) or a serving grant based at least in part on informing the serving RNC that the second carrier is activated; means for receiving, at the serving NodeB, a confirmation from the serving RNC that the one or more non-serving NodeB cells have achieved synchronization with the UE over the secondary carrier; and
means for scheduling, at the serving NodeB, the UE without limiting the TBS or the serving grant based at least in part on receiving the confirmation from the serving RNC.

11. The apparatus according to claim 10, further comprising means for adapting the maximum transmit block size based on knowledge of a loading condition at neighboring cells.

12. The apparatus according to claim 10, wherein the secondary carrier is activated when the UE is a dual-cell High-Speed Uplink Packet Access (DC-HSUPA) configured UE in soft handover with multiple NodeBs.

13. The apparatus according to claim 10, further comprising means for periodically receiving the maximum transmit block size for all users, whereby an impact of interference at the one or more non-serving NodeB cells is limited when the secondary carrier is re-activated.

14. The apparatus according to claim 10, further comprising means for receiving a pre-configured maximum serving grant upon secondary carrier re-activation.

15. The apparatus according to claim 10, further comprising:
means for informing the one or more non-serving NodeB cells that the secondary carrier was activated; and
means for informing the serving RNC when synchronization has been achieved.

16. The apparatus according to claim 15, wherein the means for informing informs the serving RNC when synchronization has been achieved occurs after the secondary carrier was activated.

17. An apparatus for de-activating a secondary carrier at a serving NodeB, comprising:
means for controlling, from the serving NodeB, de-activation of the secondary carrier at a user equipment (UE) using high-speed shared control channel (HS-SCCH) orders;
means for receiving, at the serving NodeB, acknowledgement of the HS-SCCH orders from the UE;
means for informing, by the serving NodeB, a serving radio network controller (RNC) when the secondary carrier was de-activated based on the HS-SCCH orders;
means for informing, by one or more non-serving NodeBs, the serving RNC of a radio link failure on the secondary carrier;
means for receiving, by the one or more non-serving NodeBs, instructions from the serving RNC to halt physical layer synchronization procedures on the second carrier based at least in part on informing, by the serving NodeB, the serving RNC when the second carrier was de-activated and on informing, by the one or more non-serving NodeBs, the serving RNC of the radio link failure on the secondary carrier; and means for halting physical layer synchronization procedures on the second carrier based at least in part on receiving instructions from the serving RNC.

18. An apparatus for activating a secondary carrier at a serving NodeB, comprising:
    means for controlling, from the serving NodeB, activation of the secondary carrier at a user equipment (UE) using high-speed shared control channel (HS-SCCH) orders;
    means for receiving, at the serving NodeB, acknowledgement of the HS-SCCH orders from the UE;
    means for informing, by the serving NodeB, a serving radio network controller (RNC) when the secondary carrier was activated based on the HS-SCCH orders;
    means for resuming, at one or more non-serving NodeBs, physical layer synchronization procedures on the secondary carrier based at least in part on an indication from the serving RNC that the second carrier is activated;
    means for informing, at the one or more non-serving NodeBs, the serving RNC of a restored radio link; and
    means for sending, from the serving RNC, a confirmation that all radio links are restored in the UE active set on the secondary carrier.

19. A computer program product comprising:
    a non-transitory computer-readable media comprising:
        code for causing a computer to activate a secondary carrier at a serving NodeB, comprising instructions to:
            inform a serving radio network controller (RNC) when a secondary carrier for a user equipment (UE) was activated at one or more non-serving NodeB cells;
            schedule the UE at least in part by limiting a transmit block size (TBS) or a serving grant based at least in part on informing the serving RNC that the second carrier is activated;
            receive, at the serving NodeB, a confirmation from the serving RNC that the one or more non-serving NodeB cells have achieved synchronization with the UE over the secondary carrier; and
            schedule, at the serving NodeB, the UE without limiting the TBS or the serving grant based at least in part on receiving the confirmation from the serving RNC.

20. The computer program product according to claim 19, further comprising instructions to adapt the maximum transmit block size based on knowledge of a loading condition at neighboring cells.

21. The computer program product according to claim 19, wherein the secondary carrier is activated when the UE is a dual-cell High-Speed Uplink Packet Access (DC-HSUPA) configured UE in soft handover with multiple NodeBs.

22. The computer program product according to claim 19, further comprising instructions to periodically receive the maximum transmit block size for all users, whereby an impact of interference at the one or more non-serving NodeB cells is limited when the secondary carrier is re-activated.

23. The computer program product according to claim 19, further comprising instructions to receive a pre-configured maximum serving grant upon secondary carrier re-activation.

24. The computer program product according to claim 19, further comprising:
    instructions to inform the one or more non-serving NodeB cells that the secondary carrier was activated; and
    instructions to inform the serving RNC when synchronization has been achieved.

25. The computer program product according to claim 24, wherein the instructions to inform inform the serving RNC when synchronization has been achieved occurs after the secondary carrier was activated.

26. A computer program product comprising:
    a non-transitory computer-readable media comprising:
        code for causing a computer to de-activate a secondary carrier at a serving NodeB, comprising instructions to:
            control, from the serving NodeB, de-activation of the secondary carrier at a user equipment (UE) using high-speed shared control channel (HS-SCCH) orders;
            receive, at the serving NodeB, acknowledgement of the HS-SCCH orders from the UE;
            inform, by the serving NodeB, a serving radio network controller (RNC) when the secondary carrier was de-activated based on the HS-SCCH orders;
            inform, by one or more non-serving NodeBs, the serving RNC of a radio link failure on the secondary carrier;
            receive, by the one or more non-serving NodeBs, instructions from the serving RNC to halt physical layer synchronization procedures on the second carrier based at least in part on informing, by the serving NodeB, the serving RNC when the second carrier was de-activated and on informing, by the one or more non-serving NodeBs, the serving RNC of the radio link failure on the secondary carrier; and
            halt physical layer synchronization procedures on the second carrier based at least in part on receiving instructions from the serving RNC.

27. A computer program product comprising:
    a non-transitory computer-readable media comprising:
        code for causing a computer to activate a secondary carrier at a serving NodeB, comprising instructions to:
            control, from the serving NodeB, activation of the secondary carrier at a user equipment (UE) using high-speed shared control channel (HS-SCCH) orders;
            receive, at the serving NodeB, acknowledgement of the HS-SCCH orders from the UE;
            inform, by the serving NodeB, a serving radio network controller (RNC) when the secondary carrier was activated based on the HS-SCCH orders;
            resume, at one or more non-serving NodeBs, physical layer synchronization procedures on the secondary carrier based at least in part on an indication from the serving RNC that the second carrier is activated;
            inform, at the one or more non-serving NodeBs, the serving RNC of a restored radio link; and
            send, from the serving RNC, a confirmation that all radio links are restored in the UE active set on the secondary carrier.

28. A serving NodeB for activating or de-activating a secondary carrier, comprising:
    a processor;
    memory in electronic communication with the processor;
    instructions stored in the memory, the instructions being executable by the processor to:
        inform a serving radio network controller (RNC) when a secondary carrier for a user equipment (UE) was activated at one or more non-serving NodeB cells;

schedule the UE at least in part by limiting a transmit block size (TBS) or a serving grant based at least in part on informing the serving RNC that the second carrier is activated;

receive, at the serving NodeB, a confirmation from the serving RNC that the one or more non-serving NodeB cells have achieved synchronization with the UE over the secondary carrier; and schedule, at the serving NodeB, the UE without liming the TBS or the serving grant based at least in part on receiving the confirmation from the serving RNC.

29. The NodeB according to claim 28, further comprising instructions to adapt the maximum transmit block size based on knowledge of a loading condition at neighboring cells.

30. The NodeB according to claim 28, wherein the secondary carrier is activated when the UE is a dual-cell High-Speed Uplink Packet Access (DC-HSUPA) configured UE in soft handover with multiple NodeBs.

31. The NodeB according to claim 28, further comprising instructions to periodically receive the maximum transmit block size for all users, whereby an impact of interference at the one or more non-serving NodeB cells is limited when the secondary carrier is re-activated.

32. The NodeB according to claim 28, further comprising instructions to receive a pre-configured maximum serving grant upon secondary carrier re-activation.

33. The NodeB according to claim 28, further comprising:
instructions to inform the one or more non-serving NodeB cells that the secondary carrier was activated; and
instructions to inform the serving RNC when synchronization has been achieved.

34. The NodeB according to claim 33, wherein the instructions to inform inform the serving RNC when synchronization has been achieved occurs after the secondary carrier was activated.

35. A serving NodeB for de-activating a secondary carrier, comprising:
a processor;
memory in electronic communication with the processor;
instructions stored in the memory, the instructions being executable by the processor to:
control, from the serving NodeB, de-activation of the secondary carrier at a user equipment (UE) using high-speed shared control channel (HS-SCCH) orders;
receive, at the serving NodeB, acknowledgement of the HS-SCCH orders from the UE;
inform, by the serving NodeB, a serving radio network controller (RNC) when the secondary carrier was de-activated based on the HS-SCCH orders;
inform, by one or more non-serving NodeBs, the serving RNC of a radio link failure on the secondary carrier;
receive, by the one or more non-serving NodeBs, instructions from the serving RNC to halt physical layer synchronization procedures on the second carrier based at least in part on the informing, by the serving NodeB, the serving RNC when the second carrier was de-activated and on informing, by the one or more non-serving NodeBs, the serving RNC of the radio link failure on the secondary carrier; and
halt physical layer synchronization procedures on the second carrier based at least in part on receiving instructions from the serving RNC.

36. A serving NodeB for activating a secondary carrier, comprising:
a processor;
memory in electronic communication with the processor;
instructions stored in the memory, the instructions being executable by the processor to:
control, from the serving NodeB, activation of the secondary carrier at a user equipment (UE) using high-speed shared control channel (HS-SCCH) orders;
receive, at the serving NodeB, acknowledgement of the HS-SCCH orders from the UE;
inform, by the serving NodeB, a serving radio network controller when the secondary carrier was activated based on the HS-SCCH orders;
resume, at one or more non-serving NodeBs, physical layer synchronization procedures on the secondary carrier based at least in part on an indication from the serving RNC that the second carrier is activated;
inform, at the one or more non-serving NodeBs, the serving RNC of a restored radio link; and
send, from the serving RNC, a confirmation that all radio links are restored in the UE active set on the secondary carrier.

\* \* \* \* \*